(12) United States Patent
Batur (10) Patent No.: US 8,061,296 B1
(45) Date of Patent: Nov. 22, 2011

(54) PIPE TREATMENT APPARATUS (76) Inventor: Tom Batur, Moorooduc (AU)

( * ) Notice: Subject to any disclaimer, the term of this patent is extended or adjusted under 35 U.S.C. 154(b) by 217 days.

(21) Appl. No.: 12/398,436

(22) Filed: Mar. 5, 2009

(51) Int. Cl.
B05B 13/06 (2006.01)
B05B 3/00 (2006.01)
B05C 5/00 (2006.01)

(52) U.S. Cl. ........ 118/318; 118/306; 118/317; 118/320; 118/323

(58) Field of Classification Search ............... 118/318, 118/306, 254
See application file for complete search history.

(56) References Cited

U.S. PATENT DOCUMENTS

| | | | |
|---|---|---|---|
| 2,303,088 A * | 11/1942 | Perkins | 239/218.5 |
| 3,109,262 A | 11/1963 | Weaver et al. | |
| 3,858,552 A * | 1/1975 | Takata et al. | 118/318 |
| 4,036,173 A | 7/1977 | Nicklas | |
| D269,013 S | 5/1983 | Tutton | |
| 4,557,079 A | 12/1985 | Sheesley | |
| 4,995,201 A | 2/1991 | von Borcke et al. | |
| 5,239,786 A | 8/1993 | Carpenter | |
| D347,498 S | 5/1994 | Cannon | |
| 6,514,346 B1 | 2/2003 | Nichols | |
| 6,699,324 B1 | 3/2004 | Berdin et al. | |
| 6,916,502 B2 | 7/2005 | Moore et al. | |

* cited by examiner

Primary Examiner — Dah-Wei Yuan
Assistant Examiner — Binu Thomas
(74) Attorney, Agent, or Firm — Mark A. Crossley; Crossley Patent Law (57) ABSTRACT The pipe treatment apparatus rotates a pipe to be treated, from the pipe exterior. The apparatus provides easy adaptation to varied pipe lengths and pipe diameters. The blast nozzle delivers blast media to the pipe interior to clean and prepare the interior for coating. The spray head delivers various chosen coatings to the pipe interior. The blast nozzle and spray head are easily installed and removed. The trolley and telescopic member with c-channel, along with the longitudinal drive motor with drive roller propel either the blast nozzle or spray nozzle into, within, and out of the pipe, as the rotational motor and transverse rollers turn the pipe from the pipe exterior. The apparatus therefore provides a basic design with which pipe can be both cleaned and coated within.

1 Claim, 7 Drawing Sheets

PIPE TREATMENT APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Pipe is used to transport a variety of substances which partially include oil, gasses, and water. At least two significant concerns are present. The first concern is pipe longevity which is strongly related to what is carried within a pipe. Another is flow within the pipe, which relates to interior surface friction. These two concerns may dictate that pipe be internally cleaned and coated. Methods and equipment for performing both cleaning and coating tasks vary greatly. Few devices are capable of performing both tasks. Methods and equipment also differ in choices of whether to move the pipe around and longitudinally along equipment or to move the equipment within and along the length of the pipe. Rotating equipment for cleaning and coating pipe interior, within the pipe, requires many additional safeguards against invasion of such equipment, especially by blast media used to clean the pipe interior. Painting equipment is also subject to greater safeguards if the equipment must be rotated within the pipe. And, rotating blast and painting equipment within the pipe is inherently more complex and expensive. Another problem encountered in cleaning and coating pipe interiors is the adaptation of equipment to a wide variety of pipe interior dimensions. Most devices are severely limited with respect to accommodating a plurality of widely diverse interior pipe diameters. Accommodating a wide diversity of pipe lengths is also problematic. An ideal apparatus for treating the interior of pipes should therefore both clean and coat the pipe interior. The ideal apparatus should be as basic as is possible and still provide automated operation. The ideal apparatus should rotate the pipe, and not the cleaning and painting equipment, thereby lending its design to a more basic level and the equipment used to less expensive provision and construction. The present apparatus provides these advantages.

FIELD OF THE INVENTION

The pipe treatment apparatus relates to cleaning and coating equipment for pipe interiors and more especially to a combined pipe interior cleaning and coating apparatus.

SUMMARY OF THE INVENTION

The general purpose of the pipe treatment apparatus, described subsequently in greater detail, is to provide a pipe treatment apparatus which has many novel features that result in an improved pipe treatment apparatus which is not anticipated, rendered obvious, suggested, or even implied by prior art, either alone or in combination thereof.

To attain this, the pipe treatment apparatus rotates a pipe to be treated, from the pipe exterior. The apparatus therefore negates the need for devices which are rotated within the pipe. Further, the apparatus provides easy adaptation to varied pipe lengths and pipe diameters. The blast nozzle delivers blast media to the pipe interior to clean and prepare the interior for coating. The spray head delivers various chosen coatings to the pipe interior. The blast nozzle and spray head are easily installed and removed. The trolley and telescopic member with c-channel, along with the longitudinal drive motor with drive roller propel either the blast nozzle or spray nozzle into, within, and out of the pipe, as the rotational motor and transverse rollers turn the pipe from the pipe exterior. The apparatus therefore provides a basic design with which pipe can be both cleaned and coated within.

Thus has been broadly outlined the more important features of the improved pipe treatment apparatus so that the detailed description thereof that follows may be better understood and in order that the present contribution to the art may be better appreciated.

An object of the pipe treatment apparatus is to blast an interior of a pipe with cleaning media.

Another object of the pipe treatment apparatus is to coat an interior of a pipe with pipe coating.

A further object of the pipe treatment apparatus is to completely blast and coat a pipe interior by rotating the exterior of the pipe.

An added object of the pipe treatment apparatus is to selectively propel the blast nozzle and spray device into and out of the pipe.

Yet another object of the pipe treatment apparatus is to easily adapt to a plurality of pipe lengths.

These together with additional objects, features and advantages of the improved pipe treatment apparatus will be readily apparent to those of ordinary skill in the art upon reading the following detailed description of presently preferred, but nonetheless illustrative, embodiments of the improved pipe treatment apparatus when taken in conjunction with the accompanying drawings.

In this respect, before explaining the current embodiments of the improved pipe treatment apparatus in detail, it is to be understood that the pipe treatment apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved pipe treatment apparatus.

It is therefore important that the claims be regarded as including such equivalent constructions insofar as they do not depart from the spirit and scope of the pipe treatment apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the pipe treatment apparatus generally designated by the reference number 10 will be described.

Figure 1:
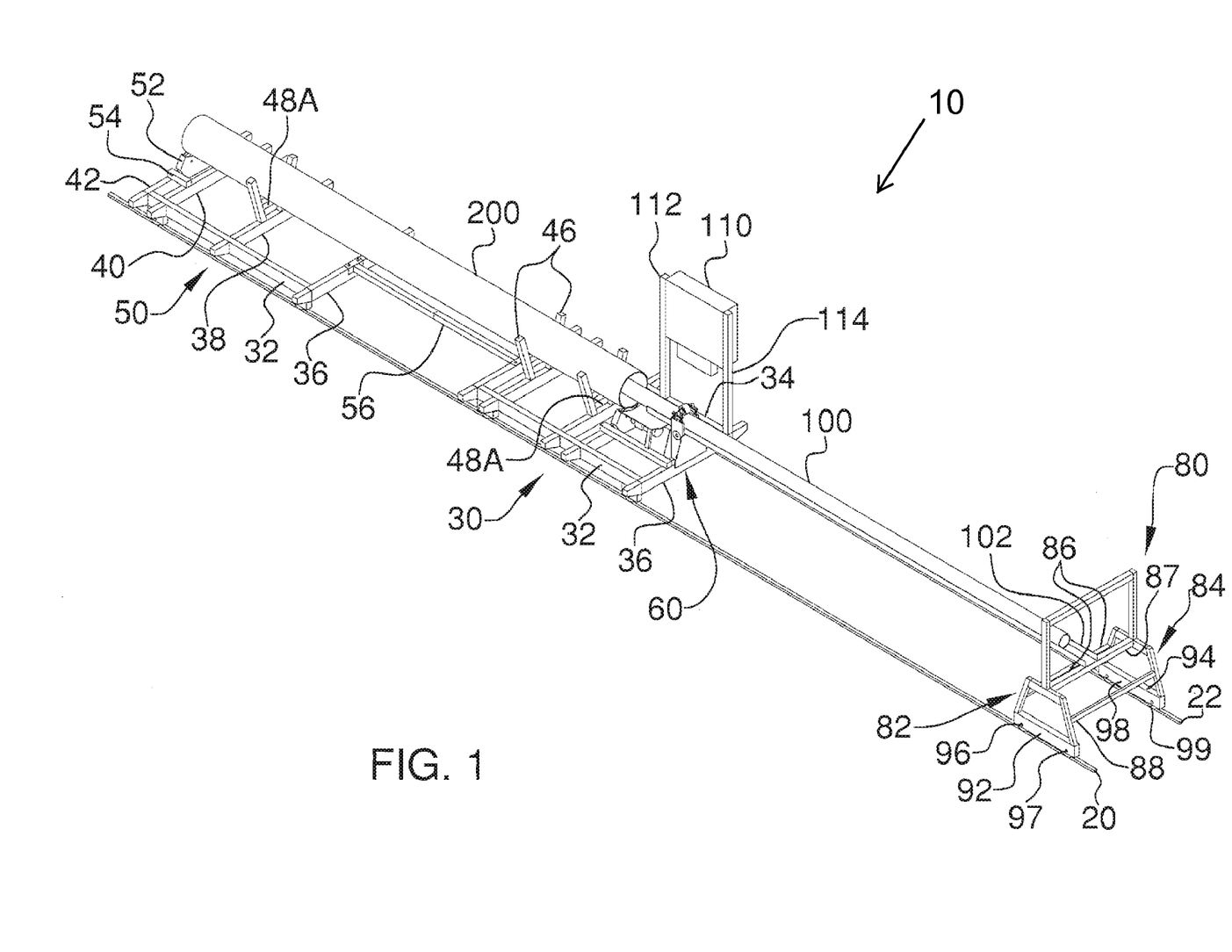
FIG. 1 is a perspective view of the apparatus treating a pipe.
Figure 2:
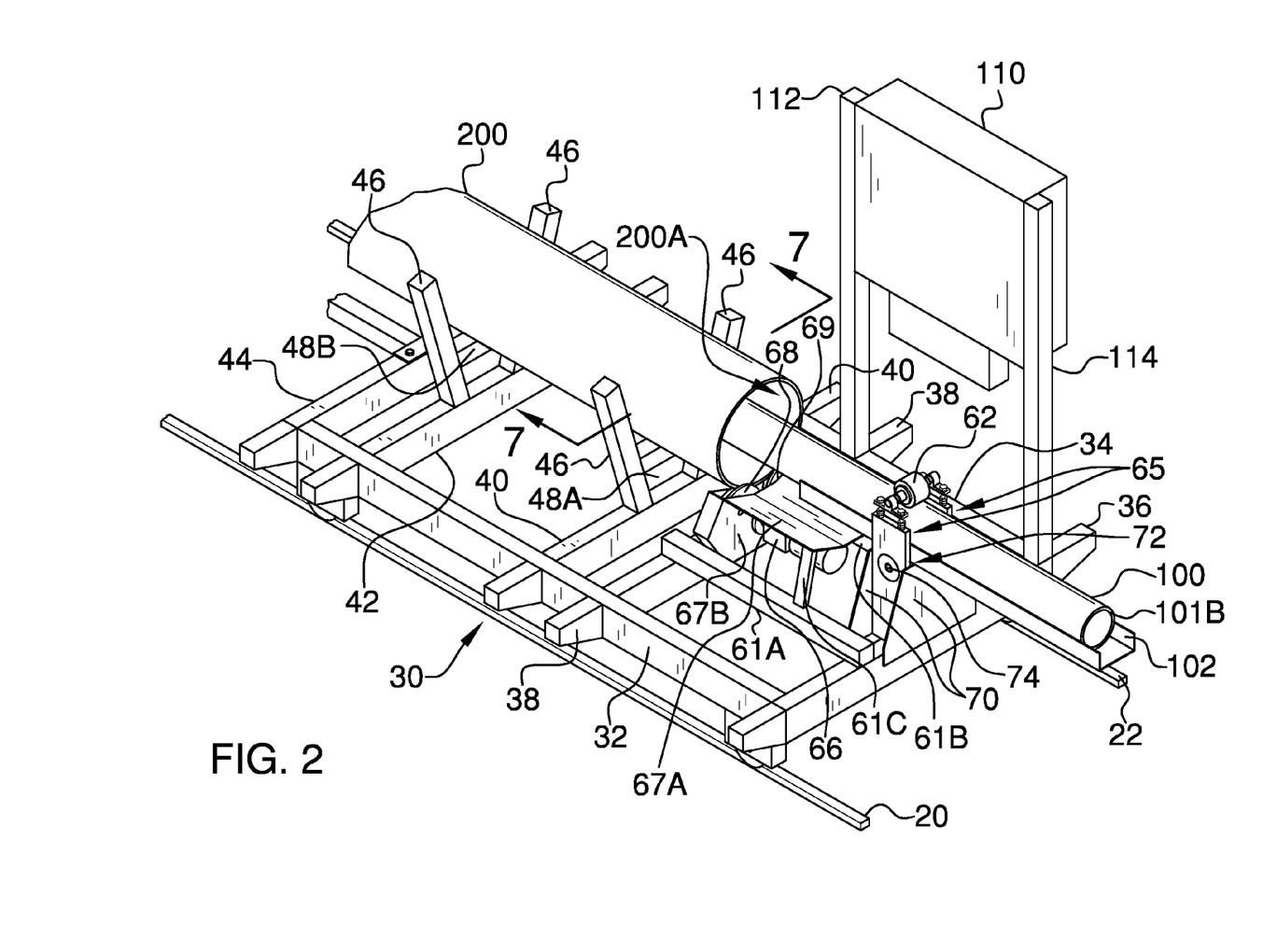
FIG. 2 is a partial perspective view of the apparatus treating a pipe.

Referring to FIGS. 1 and 2, the pipe treatment apparatus 10 selectively treats the pipe interior 200a of the pipe 200 via automation. The longitudinal drive with motor with roller 72 (shown only by arrow) is disposed within the roller housing 70. The drive roller propels the c-channel 102 toward and away from the pipe interior 200a. The c-channel 102 is affixed to the telescopic member 100. The idler roller 62 is adjustably fitted against the telescopic member 100. The longitudinal drive motor with roller 72 is controlled by the control box 110. The pipe 200 is rotated by the first transverse roller 68 and the second transverse roller 69. The transverse rollers are powered by the rotational motor 66 which is controlled by the control box 110.

Referring again to FIG. 1, the apparatus 10 comprises a pair of spaced apart frame rails comprising the first frame rail 20 and the second frame rail 22. The pair of spaced apart movable frames is movably disposed atop the frame rails. The movable frames comprise the first movable frame 30 and the second movable frame 50. The adjustable extension arm 56 is affixed to the first movable frame 30 and the second movable frame 50. The extension arm 56 positions the movable frames in spatial relationship.

Figure 3:
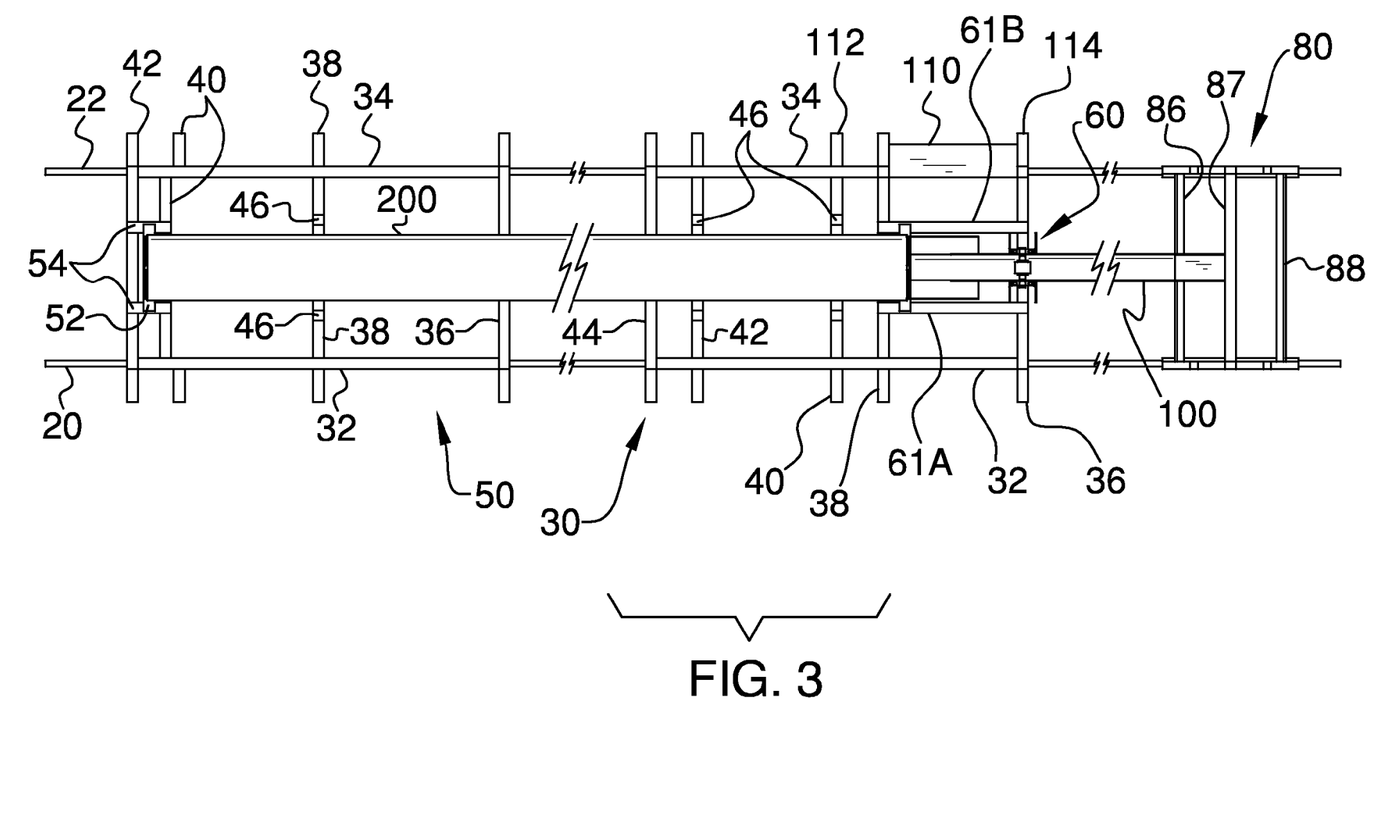
FIG. 3 is a top plan view of the apparatus treating a pipe.
Figure 4:
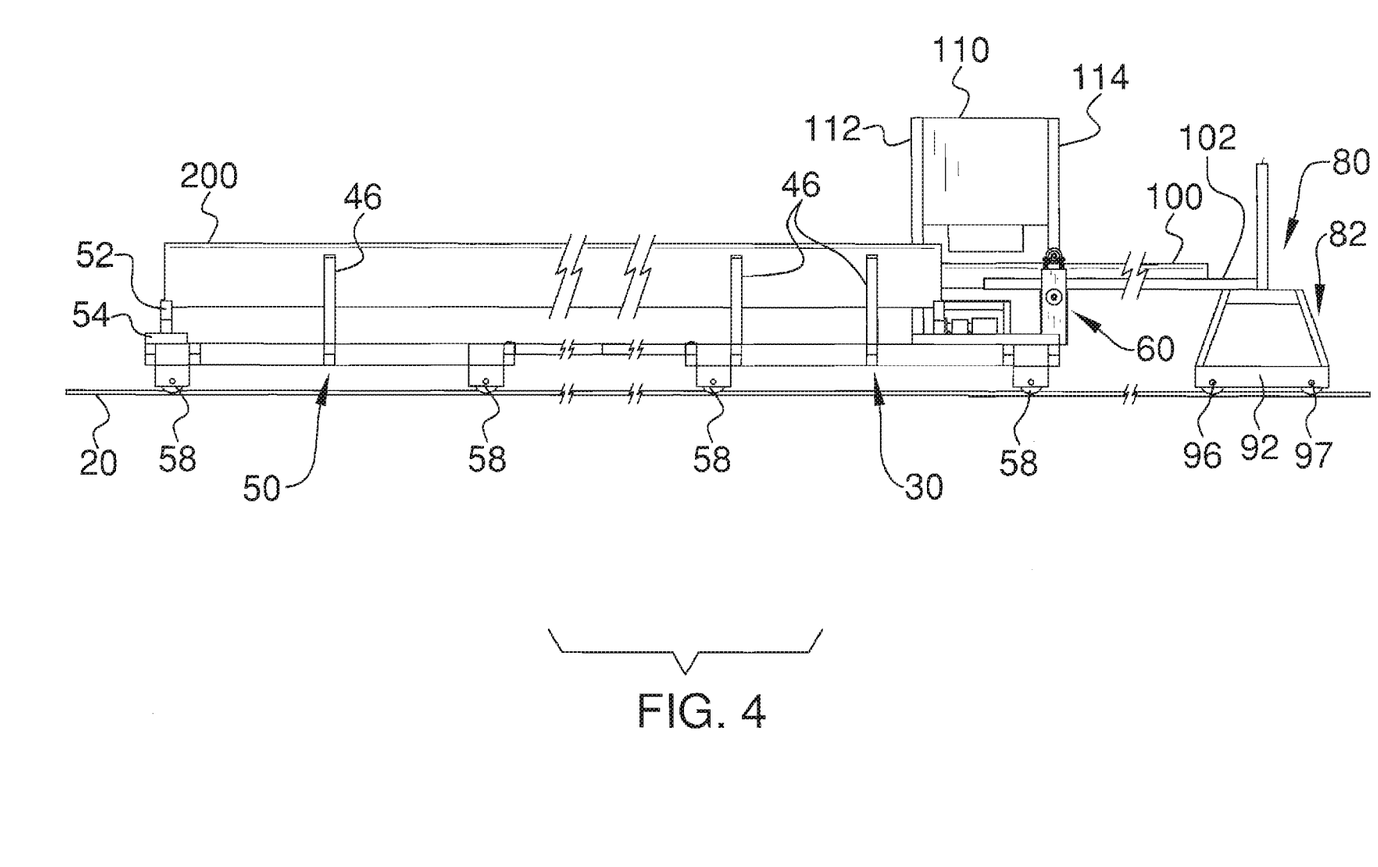
FIG. 4 is a lateral elevation view of the apparatus treating a pipe.

Referring to FIGS. 2, 3, and 4, the first movable frame 30 comprises the first longitudinal member 32 spaced apart from the second longitudinal member 34. The first longitudinal member 32 is disposed above the first frame rail 20. The second longitudinal member 34 is disposed above the second frame rail 22. The plurality of spaced apart transverses connects the first longitudinal member 32 to the second longitudinal member 34. The transverses comprise the first transverse 36, the second transverse 38, the third transverse 40, the fourth transverse 42, and the fifth transverse 44. A pair of spaced apart upward and outwardly angled safety rails 46 is disposed atop the third transverse 40. A transversely disposed first rail brace 48a connects the pair of angled safety rails 46 disposed atop the third transverse 40. A pair of spaced apart upward and outwardly angled safety rails 46 is disposed atop the fourth transverse 42. A transversely disposed second rail brace 48b connects the pair of safety rails 46 disposed atop the fourth transverse 42. The propulsion unit 60 is disposed atop the first transverse 36 and the second transverse 38. The propulsion unit 60 comprises the first frame beam 61a spaced apart from the second frame beam 61b. The pair of adjacently disposed transverse rollers within the roller housing 67b is disposed between the first beam 61a and the second beam 61b. The transverse rollers comprise the first transverse roller 68 and the second transverse roller 69. Each transverse roller is in contact with the existing pipe 200 which is selectively disposed atop the transverse rollers. The propulsion unit 60 further comprises the rotational motor 66 driving the transverse rollers. The pipe 200 is selectively rotated by the transverse rollers. The shield 67a is disposed above the rotational motor 66. The shield 67a is supported by the pair of spaced apart upward supports comprising the first upward support 61c and the identical second upward support 61d (not shown). The roller housing 70 is disposed atop the first transverse 36. The longitudinal drive motor with drive roller 72 (not shown but indicated by arrow) is disposed within the roller housing 70. The idler roller 62 is selectively disposed atop the roller housing 70. The idler roller adjustment 65 is affixed between the idler roller 62 and the roller housing 70. The adjustment 65 provides most ideal contact of the idler roller 62 with the telescopic member 100.

Referring to FIGS. 1, 2, 3, and 4, the second movable frame 50 comprises longitudinal members identical to that of the first movable frame 30. The first longitudinal member 32 is spaced apart from the second longitudinal member 34. The first longitudinal member 36 is disposed above the first frame rail 20. The second longitudinal member 34 is disposed above the second frame rail 22. The plurality of spaced apart transverses connects the first longitudinal member 32 to the second longitudinal member 34. The transverses comprise the first transverse 36, the second transverse 38, the third transverse 40, and the fourth transverse 42. The transverses of the second movable frame 50 are identical to those of the first movable frame 30 with the exception of the omission of a fifth transverse 44 on the second movable frame 50. A pair of spaced apart upward and outwardly angled safety rails 46 is disposed atop the second transverse 38. A transversely disposed first rail brace 48a connects the pair of angled safety rails 46 disposed atop the second transverse 38. The identical spaced apart cradle braces 54 are disposed perpendicularly atop the third transverse 40 and the fourth transverse 42.

The cradle with roller 52 is affixed to the cradle braces 54. The cradle with roller selectively supports the pipe 200.

Figure 7:
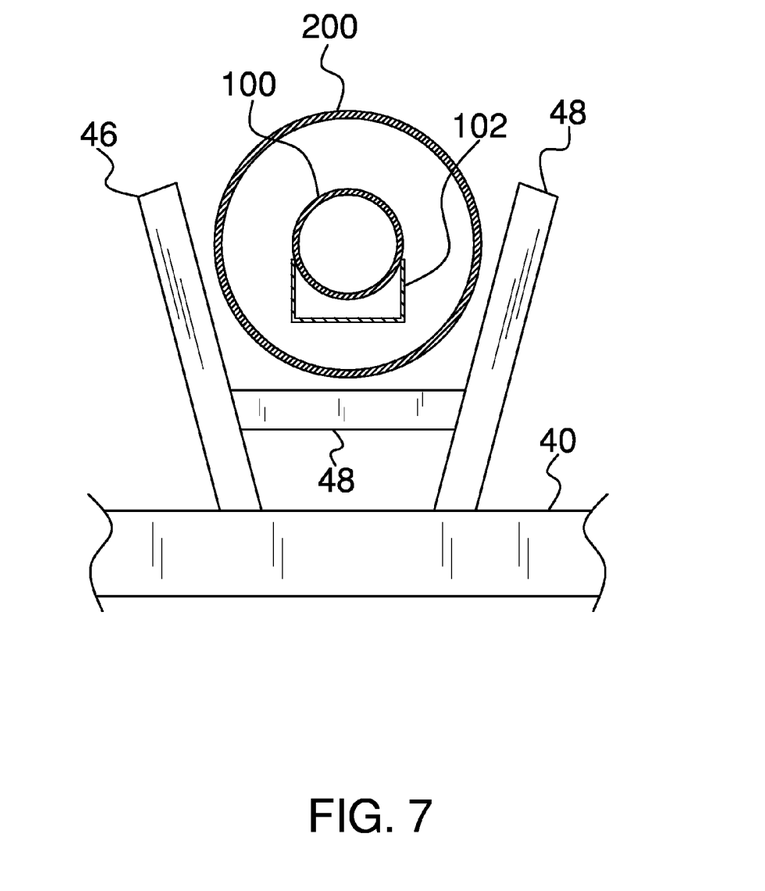
FIG. 7 is a partial cross sectional end view of the telescopic member within a pipe.

Referring to FIGS. 1 and 7, the movable trolley 80 is disposed on the frame rails. The trolley 80 is moved toward and away from the first movable frame 30. The trolley 80 comprises a first A-frame 82 spaced apart from a second A-frame 84. The first A-frame 82 is disposed above the first frame rail 20. The second A-frame 84 is disposed above the second frame rail 22. A first lower support 92 is disposed on a bottom of the first A-frame 82. The first lower support 92 has a first wheel 96 spaced apart from a second wheel 97. Each wheel is disposed on the first frame rail 20. The second lower support 94 is disposed on a bottom of the second A-frame 84. The second lower support 94 has a third wheel 98 spaced apart from a fourth wheel 99, each wheel disposed on the second frame rail 22. A plurality of A-frame supports connects the first A-frame 82 to the second A-frame 84. The A-frame supports comprising the first A-frame support 86, the second A-frame support 87, and the third A-frame support 88. The c-channel 102 is affixed atop the second A-frame support 87. The c-channel 102 is movably disposed atop the longitudinal drive motor with drive roller 72. The telescopic member 100 is affixed atop the c-channel 102. The telescopic member 100 is in selective contact with the idler roller 62. The telescopic member 100 has a first end 101a and a second end 101b. The first end 101a is movably disposed within the pipe 200 via the movable trolley 80 and the longitudinal drive motor with drive roller 72.

Figure 5:
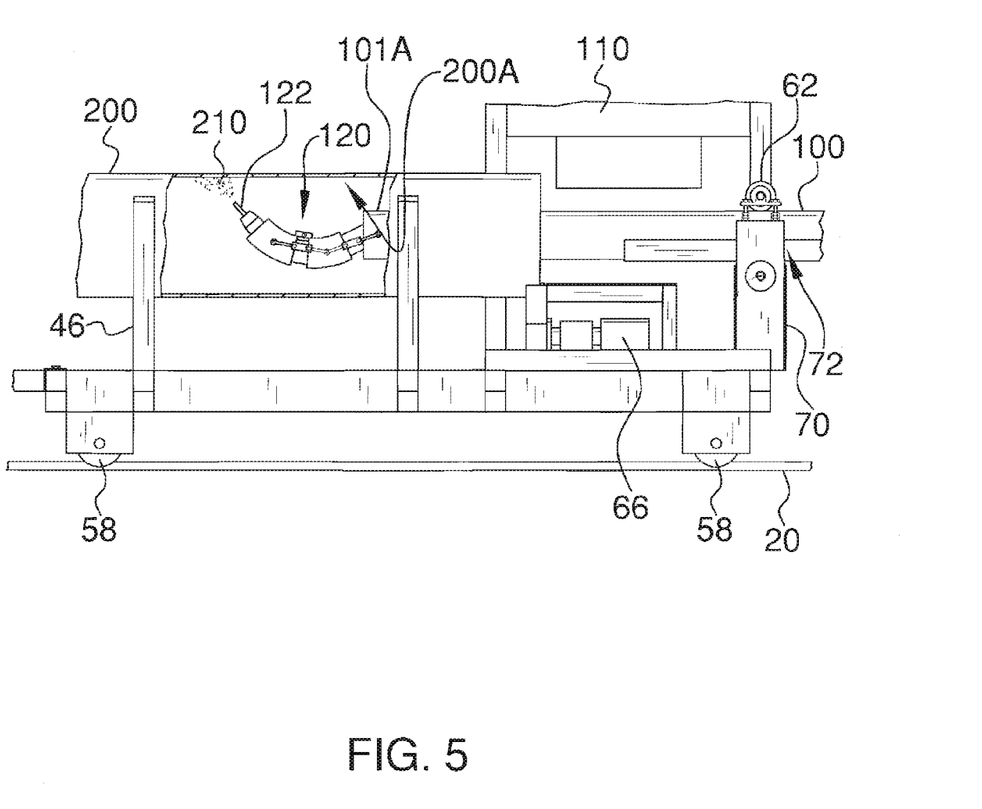
FIG. 5 is a partial lateral cutaway view of the apparatus media blasting a pipe interior.

Referring to FIG. 5, the adjustable jointed blast arm 120 is removably affixed to the first end of the telescopic member 100. The blast arm 120 selectively deliverers blast media 210 to the pipe interior 200a via the blast nozzle 122.

Figure 6:
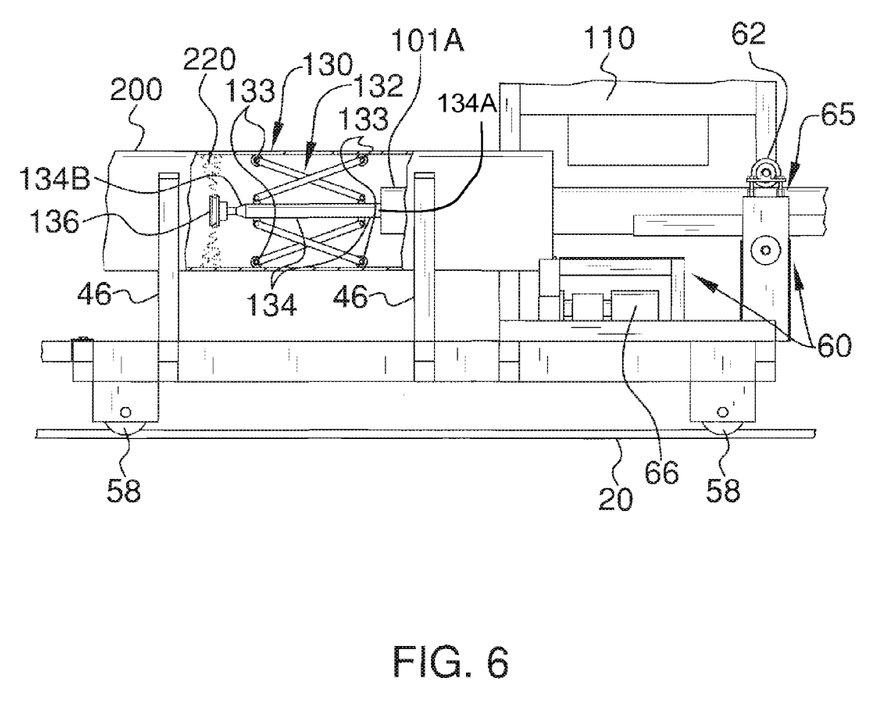
FIG. 6 is a partial lateral cutaway view of the apparatus coating a pipe interior.

Referring to FIG. 6, the spray device 130 is selectively disposed within the pipe interior 200a. The spray device 130 comprises a central shaft 134 having a shaft first end 134a spaced apart from a shaft second end 134b. The shaft first end 134a is removably affixed to the second end 101b of the telescopic member 100. The scissor support 132 is affixed to the central shaft 134. The scissor support 132 guides the shaft 134 and telescopic member 100 within the pipe interior 200a via the plurality of scissor wheels 133 on the scissor support 132. The spray head 136 affixed to the shaft second end 134b delivers the coating 220 to the pipe interior 200a.

Referring to FIG. 2, the control box 110 is affixed atop the first transverse 36 and the second transverse 38 of the first movable frame 30. The control box 110 is affixed via the first box support 112 spaced apart from the second box support 114. The control box 110 is in communication with the propulsion unit 60, the blast arm 120, and the spray device 130. The control box 110 is selectively set to provide automated performance of the apparatus 10 treatment tasks.

With respect to the above description then, it is to be realized that the optimum dimensional relationships for the parts of the pipe treatment apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the pipe treatment apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the pipe treatment apparatus may be used.

Therefore, the foregoing is considered as illustrative only of the principles of the pipe treatment apparatus. Further, since numerous modifications and changes will readily occur to those skilled in the art, it is not desired to limit the pipe treatment apparatus to the exact construction and operation shown and described, and accordingly, all suitable modifications and equivalents may be resorted to, falling within the scope of the pipe treatment apparatus.

What is claimed is:

1. A pipe treatment apparatus, comprising, in combination:
    a pair of spaced apart frame rails comprising a first frame rail and a second frame rail;
    a pair of spaced apart movable frames is movably disposed atop the frame rails, the movable frames comprising a first movable frame and a second movable frame;
    a adjustable extension arm affixed to the first movable frame and the second movable frame, the extension arm positioning the movable frames in spatial relationship;
    the first movable frame comprising a first longitudinal member spaced apart from a second longitudinal member, the first longitudinal member disposed above the first frame rail, the second longitudinal member disposed above the second frame rail;
    a plurality of spaced apart transverses connecting the first longitudinal member to the second longitudinal member, the transverses comprising a first transverse, a second transverse, a third transverse, a fourth transverse, and a fifth transverse;
    a pair of spaced apart upward and outwardly angled safety rails disposed atop the third transverse;
    a transversely disposed first rail brace connecting the pair of angled safety rails disposed atop the third transverse;
    a pair of spaced apart upward and outwardly angled safety rails disposed atop the fourth transverse;
    a transversely disposed second rail brace connecting the pair of safety rails disposed atop the fourth transverse;
    a propulsion unit disposed atop the first transverse and the second transverse, the propulsion unit comprising:
        a first frame beam spaced apart from a second frame beam;
        a roller housing disposed between the first frame beam and the second frame beam;
        a pair of adjacently disposed transverse rollers disposed within the roller housing, the transverse rollers comprising a first transverse roller and a second transverse roller, each transverse roller in contact with an existing pipe selectively disposed atop the transverse rollers;
        a rotational motor driving the transverse rollers, the existing pipe selectively rotated by the transverse rollers;
        a shield disposed above the rotational motor, the shield supported by a pair of identical spaced apart upward supports;
    a roller housing disposed atop the first transverse;
    a longitudinal drive motor with drive roller disposed within the roller housing;
    an idler roller is disposed atop the roller housing;
    an idler roller adjustment affixed between the idler roller and the roller housing;
    the second movable frame comprising:
        a first longitudinal member spaced apart from a second longitudinal member, the first longitudinal member disposed above the first frame rail, the second longitudinal member disposed above the second frame rail;
        a plurality of spaced apart transverses connecting the first longitudinal member to the second longitudinal member, the transverses comprising a first transverse, a second transverse, a third transverse, and a fourth transverse;
        a pair of spaced apart upward and outwardly angled safety rails disposed atop the second transverse;
        a transversely disposed first rail brace connecting the pair of safety rails disposed atop the second transverse;
        a cradle brace disposed perpendicularly atop the third transverse and the fourth transverse;
        a cradle with roller affixed to the cradle brace, the cradle with roller selectively supporting the pipe;
    a movable trolley disposed on the frame rails, the trolley moved toward and away from the first movable frame, the trolley comprising a first A-frame spaced apart from a second A-frame, the first A-frame disposed above the first frame rail, the second A-frame disposed above the second frame rail;
    a first lower support on a bottom of the first A-frame, the first lower support having a first wheel spaced apart from a second wheel, each wheel disposed on the first frame rail;
    a second lower support on a bottom of the second A-frame, the second lower support having a third wheel spaced apart from a fourth wheel, each wheel disposed on the second frame rail;
    a plurality of A-frame supports connecting the first A-frame to the second A-frame, the A-frame supports comprising a first A-frame support, a second A-frame support, and a third A-frame support;
    a c-channel affixed atop the second A-frame support, the c-channel movably disposed atop the longitudinal drive motor with drive roller;
    a telescopic member affixed atop the c-channel, the telescopic member in selective contact with the idler roller, the telescopic member having a first end and a second end, the first end movably disposed within the pipe via the movable trolley and the longitudinal drive motor with drive roller disposed below the c-channel;

an adjustable jointed blast arm removably affixed to the first end of the telescopic member, the blast arm selectively delivering a blast media to a pipe interior of the pipe via a blast nozzle;

a spray device selectively disposed within the inside of the pipe, the spray device comprising:

a central shaft having a shaft first end spaced apart from a shaft second end, the shaft first end removably affixed to the first end of the telescopic member;

a scissor support affixed to the central shaft, the scissor support guiding the shaft and telescopic member within the pipe interior via a plurality of scissor wheels;

a spray head affixed to the shaft second end, the spray head selectively delivering a coating to the pipe interior;

a control box affixed atop the first transverse and the second transverse of the first movable frame, the control box affixed via a first box support spaced apart from a second box support, the control box in communication with the propulsion unit, the adjustable jointed blast arm, and the spray device.

* * * * *